United States Patent [19]

Mills et al.

[11] 4,373,185

[45] Feb. 8, 1983

[54] TRACKING IN A DISTRIBUTION SYSTEM

[75] Inventors: David A. Mills, Plano; Norris G. Turner, Dallas, both of Tex.

[73] Assignee: E-Systems, Inc., Dallas, Tex.

[21] Appl. No.: 206,670

[22] Filed: Nov. 13, 1980

[51] Int. Cl.$^3$ ............................................. B65H 43/00
[52] U.S. Cl. ..................................... 364/478; 364/900
[58] Field of Search ................................. 364/478, 900;
414/134–136; 209/559, 563–566

[56] References Cited

U.S. PATENT DOCUMENTS

| | | | |
|---|---|---|---|
| 2,963,293 | 12/1960 | Klein | 271/57 |
| 3,067,874 | 12/1962 | Rigg et al. | 209/111.5 |
| 3,087,612 | 4/1963 | Duncan et al. | 209/74 |
| 3,169,428 | 2/1965 | Owen | 83/27 |
| 3,289,832 | 12/1966 | Ramsay | 209/75 |
| 3,352,417 | 11/1967 | Cutaia | 209/74 |
| 3,803,556 | 4/1974 | Duffy | 364/900 |
| 3,815,102 | 6/1974 | Plunkett | 364/900 |
| 3,889,811 | 6/1975 | Yoshimura | 209/74 M |
| 3,895,716 | 7/1975 | Ugo | 209/74 M |
| 3,904,516 | 9/1975 | Chiba et al. | 209/74 M |
| 3,955,678 | 5/1976 | Moyer | 209/74 M |
| 4,181,947 | 1/1980 | Krauss et al. | 364/478 |
| 4,181,948 | 1/1980 | Jackson et al. | 364/478 |
| 4,195,347 | 3/1980 | MacMunn et al. | 364/478 |
| 4,228,513 | 10/1980 | Doljack | 364/478 X |
| 4,237,598 | 12/1980 | Williamson | 364/478 X |
| 4,239,434 | 12/1980 | Gannon | 364/478 X |
| 4,240,148 | 12/1980 | Thoma | 364/478 |

*Primary Examiner*—Edward J. Wise
*Attorney, Agent, or Firm*—Robert V. Wilder; Albert M. Crowder, Jr.

[57] ABSTRACT

An item identified by a location code is tracked through a transport image in a process controller (48). The transport image is characterized by input data to the specific construction of tracker units (32, 34). Location codes for each item are received by the process controller 48 and tracked by a service routine (152) to set a divert flag or an inject flag (172). Each location code is advanced through sections of the transport image by an INCH routine (200). When the location code matches a pocket identification a divert gate is actuated to remove an item from the distribution system.

17 Claims, 9 Drawing Figures

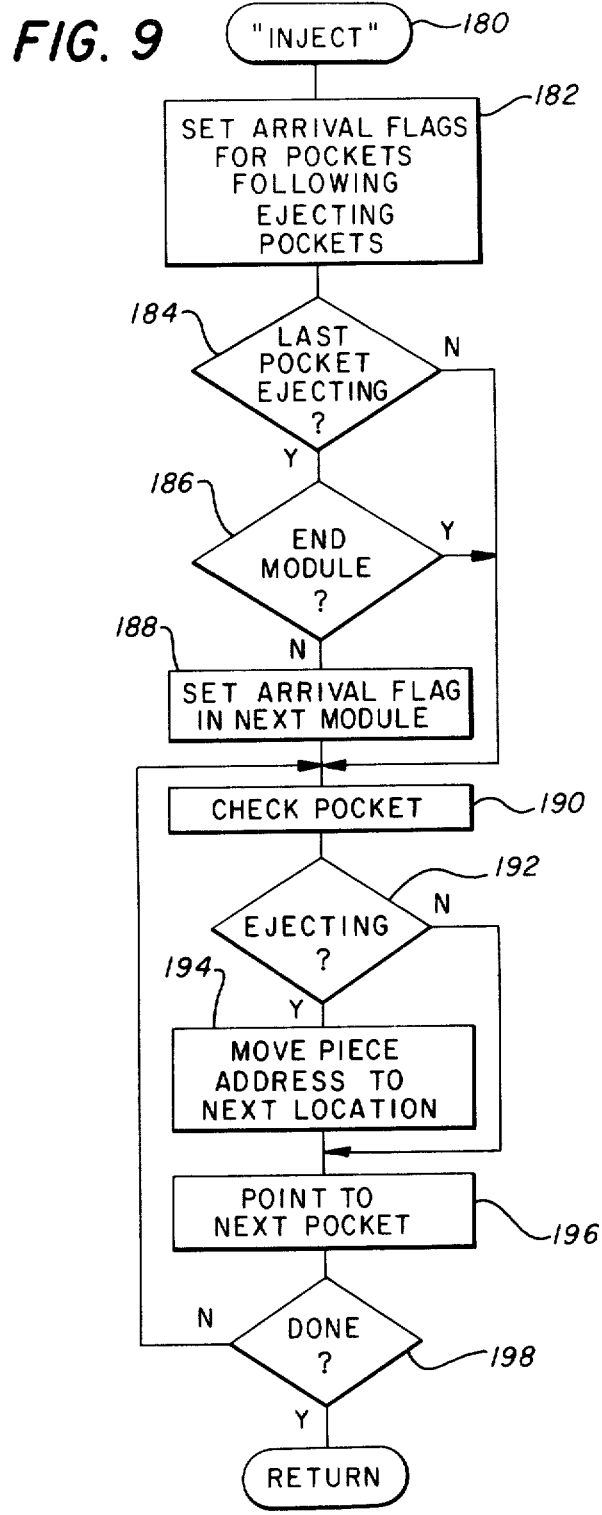

TRACKING IN A DISTRIBUTION SYSTEM

TECHNICAL FIELD

This invention relates to tracking of items through a distribution system, and more particularly to, item tracking by image progression in control apparatus for a distribution system.

BACKGROUND ART

Distribution systems of the type having automatic diverter stations for selectively transferring items into diverter pockets from a main transport are well known and in general use both for document and article distribution. Conventional distribution systems include a main transport with a plurality of diverter pockets selectively controlled in accordance with the output of a central controller. Heretofore, it was necessary to provide some form of central controller which was responsive to the progressive locations of articles along the main transport. Diverter pockets are actuated at the proper time in accordance with article progression as determined by distributed sensors. These sensors often take the form of a code reader or photocell position detectors, all providing inputs to the central controller. Thus, the actuation of a diverter pocket from the central controller relied strictly on data derived from items moving in the distribution system.

There are many applications for automated processes requiring the transportation of items (articles and/or documents) from one location to another. Where the distribution of items is required, as in accordance with the system of the present invention, the items are subdivided into multiple groupings in accordance with some particular criterion (or group of criteria) associated with the items. Systems performing such a process incorporate a means for acquiring and characterizing the item and a mechanism for transporting that item to its proper destination, all in accordance with the output of a central controller.

The requirements of the central controller are the subject of the present invention which relates to a method of "tracking" an item through an image of a distribution system. In conventional systems which sort through a large number of destinations, the transportation time associated with an item exceeds considerably the time required to acquire and characterize additional items. This is ineffective in terms of maximal throughput in that it requires the system to handle one item at a time. That is, the item is constantly monitored as it moves through the distribution system. In accordance with the present invention, the system acquires and characterizes an item, then releases the item to the central controller and the proper sortation of the item is considered accomplished without reference to the amount of time subsequently required to finally achieve that result.

Historically, tracking of an item through a distribution system has been accomplished by the use of electronic hardware coupled to the physical transport via sensors, code readers and actuator mechanisms. Generally, there is a sensor/actuator pair associated with each point of possible action in the transport. Thus, the concept underlying these previous tracking techniques has been one of directly monitoring the transport (and the items therein) with the data gathered, then evaluating the data to determine the appropriate response to the conditions implied by the monitoring devices. The implementation of hardware design systems requires coordination of the physical design with the design of the associated electronic hardware of the central controller. This necessitates individualizing the central controller to a specific transport and must be adapted at substantial cost if a different transport design is to be accommodated.

DISCLOSURE OF THE INVENTION

In accordance with the present invention, an image of the distribution system is generated in memory elements. The image describes the relationship of the physical distribution system to items traveling therein and to the divert stations at which action may be required. This image of the distribution system is dynamic and allows predictions to be made to account for changes occurring in the actual system with the passage of time. Only when necessary is a reference made to the physical distribution system by means of a series of sensors. The invention provides the advantage of reducing the amount of hardware required to achieve a desired operating characteristic of the distribution system.

In accordance with the present invention, the method of tracking an item identified by a location code to a diverter station in a distribution system includes the first step of injecting items in sequence into the distribution system, with each item identified by a location code. As each item is injected into the distribution system an injection signal is generated identifying that the item is to be tracked. A location code for each item is entered into the system and advanced through a series of distance related increments representing an image of the distribution system, which advancement tracks the item. When an item identified by a location code approaches a diverter station a tracking signal is generated to produce a diverter station operation.

In one embodiment of the invention a microprocessor is arranged to represent an image of the distribution system and perform the function of tracking an item by discrete electronic logical processes. By a microprocessor implemented embodiment of the invention, modification of the distribution system image is easily achieved to accommodated changes in the physical system. Thus, in accordance with the present invention the central controller utilizes a microprocessor to thereby enable adaptation of the distribution system image to be changed to accommodated changes in the physical system.

BRIEF DESCRIPTION OF THE DRAWINGS

A more complete understanding of the invention and its advantages will be apparent from the specification and claims and from the accompanying drawings illustrative of the invention.

Referring to the drawings:

FIG. 9 is a flow chart of an injection subroutine called during operation of the tracking subroutine of FIG. 6.

DETAILED DESCRIPTION

Figure 1:
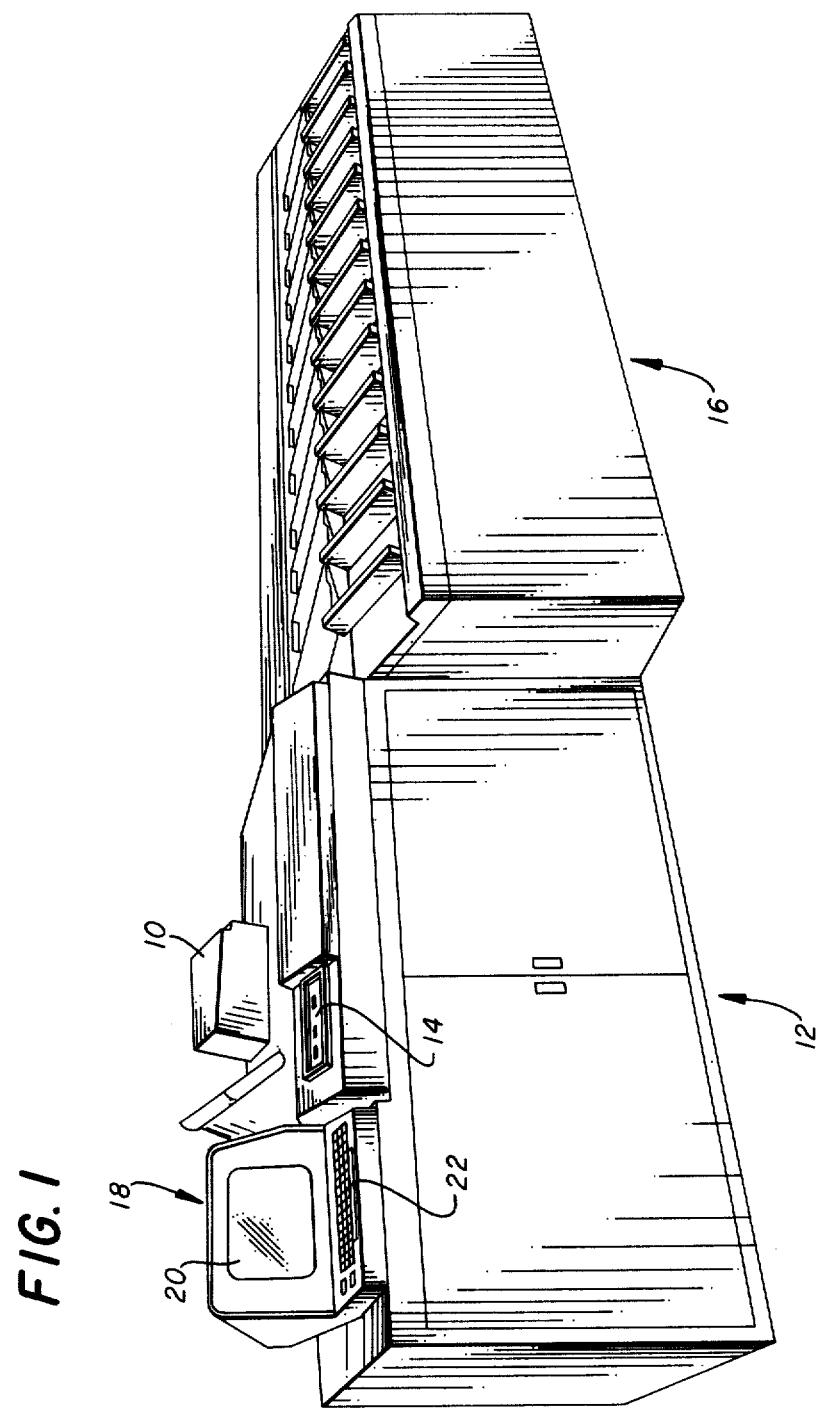
FIG. 1 is a perspective view of a distribution system for microfiche sorting into a plurality of pockets at diverter stations.

Although not limited thereto, the invention will be described with reference to a system for reading and sorting microfiche documents. The physical transport is illustrated in FIG. 1 containing twelve divert stations "pockets". In the embodiment illustrated in FIG. 1, a stack of up to 1,000 fiche is loaded into a buffer 10 located on the top surface of a cabinet 12 containing a central controller and other electronic hardware for operation of the system. Operator commands are received by the system by means of a pushbutton station 14, after the central controller has been initialized and cleared for operation. Individual fiche are picked off the bottom of the stack by a conventional vacuum mechanism and sent to the distribution system 16 by a short belt drive (not shown). When a first fiche has traveled a predetermined distance, the system automatically picks off the second fiche and each subsequent fiche maintains the same separation.

A microfiche pocket code (location code) on each fiche is read at a read station that typically includes a helium/neon laser beam of conventional configuration. Each code is read eight times in a single pass through a code reader with the various readings compared to insure valid code data. The code read from a fiche identifies the appropriate pocket via a suitable sorting scheme to which the fiche is destined, and it is this pocket code (location code) that is utilized to track the document through the distribution system 16.

Alternatively, an operator enters location code data for each fiche by means of a console 18 that includes a visual display 20 and a conventional keyboard 22.

With reference to the distribution system 16 as illustrated in FIG. 1, it consists of two stacker modules of six pockets each. The first stacker module immediately adjacent cabinet 12 contains the first six pockets while the second stacker module contains the last six pockets. Where required to describe the invention, the twelve pockets will be referred to in a normal numerical sequence with the first pocket to the left as illustrated in FIG. 1 and the twelfth pocket, identified herein for the described embodiment as the reject pocket, located in the far right of the figure.

The stacker pockets collect the fiche after being tracked through the distribution system by a code received into the central controller. The first physical pocket collects fiche identified as "no reads" and the last physical pocket collects rejects, late sorts or fiche from other situations where the fiche was not directed into its designated pocket. Pockets 2-11 are the working pockets of the distribution system for collecting those fiche that have been read, tracked and sorted by the system.

Construction of the distribution system with each divert station and its associated pocket are of conventional construction and may include any of a number of such systems commercially available. By the method of the present invention, an image of the distribution systems 16 is constructed in the central controller which enables the utilization of many available distribution systems. Further, the image constructed in the central controller for a particular distribution system may be expanded or reduced in accordance with system requirements.

Figure 2:
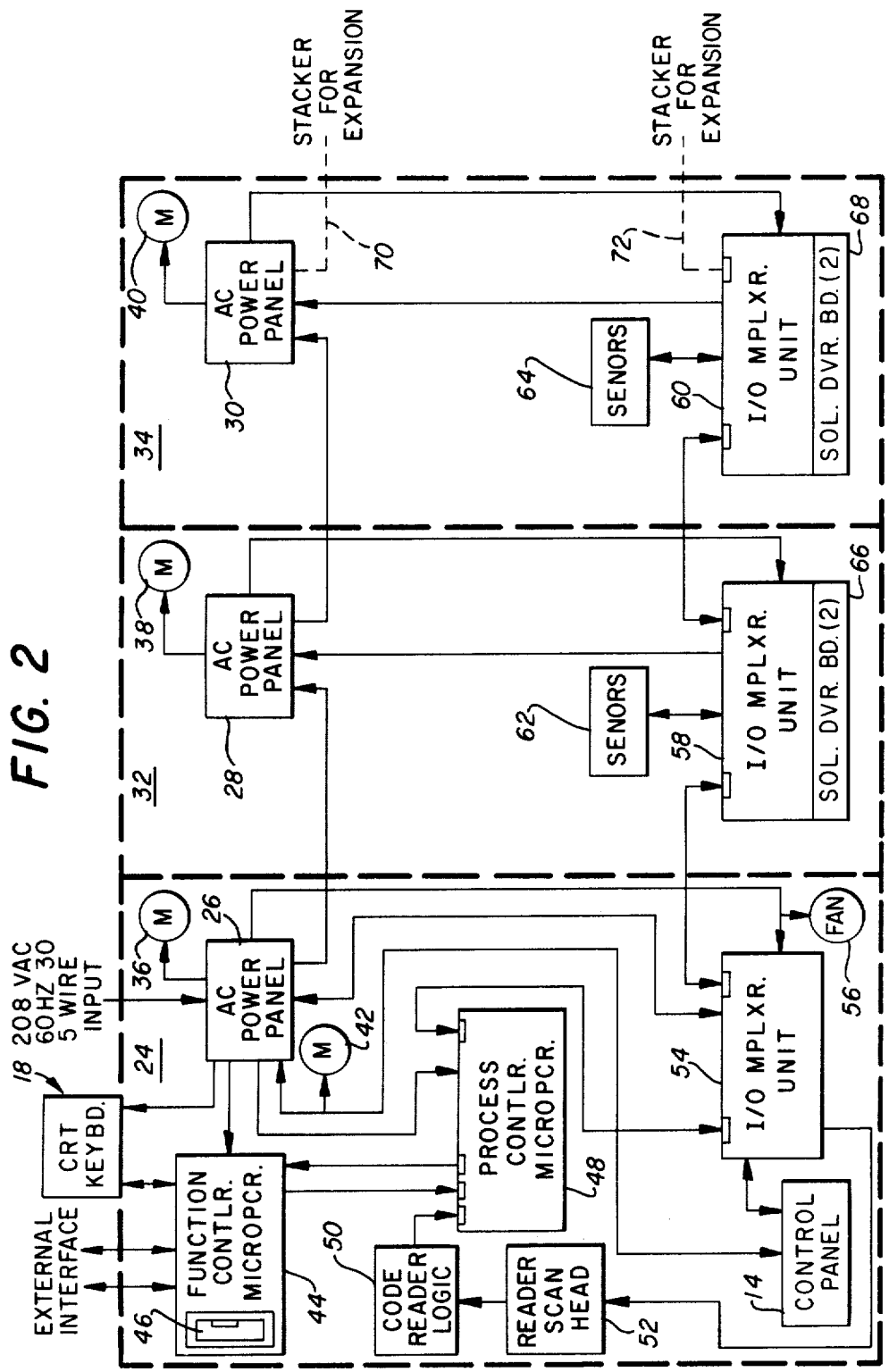
FIG. 2 is a block diagram of the microfiche distribution system of FIG. 1.

Referring to FIG. 2, the microfiche reader/sorter of FIG. 1 is illustrated in block diagram including the operator console 18 consisting of a CRT display and keyboard in addition to "power on", "run on" and "feed on" switches. The keyboard enables the manual entry of location codes for items injected into the system and the CRT display enables instructions to be displayed for operation of the central controller illustrated in FIG. 2 within the block identified with the reference numeral 24. Within the central controller 24 there is included a power panel 26 for distributing input primary power to various components of the system. This includes distribution of power to panels 28 and 30 as part of the first stacker module 32 and the second stacker module 34, respectively. To provide movement of the items through the distribution system of the stacker modules 32 and 34 a transport motor 36 is energized from the power panel 26, a transport motor 38 is energized from the power panel 28 and a transport motor 40 is energized from the power panel 30. In addition, the power panel 26 is connected to a vacuum pump motor 42.

The central controller 24 includes two Z-80 microprocessors for system control and operation. One of these Z-80 microprocessors is part of a function controller 44 that includes connections to external interface devices as required. In one implementation of the function controller 44 there is included a Zilog MCB Board, a disk controller, a programmable read-only memory (PROM), and input-output interconnections to external devices. Storage disks containing operating instructions for the function controller 44 are input to the disk drive through an access window 46.

The function controller 44 interfaces with a process controller 48, the operator console 18 and required modems for external interface. Operationally, the function controller reads and stores data from external sources, stores data during the various read and store passes for the microfiche, and performs numerical sort and pocket destination sort operations. The function controller is thus conventional hardware interconnected in accordance with known techniques.

The second Z-80 microprocessor is part of the process controller 48 which receives data transferred from the function controller 44. Details of the process controller 48 will be discussed with reference to FIG. 3.

Functionally the process controller provides the necessary commands and control signals for overall operation of the sorter system including the stacker modules 32 and 34. It carries out the method of the present invention for tracking an item through the stacker modules 32 and 34 by means of a stored image of the distribution system.

Interconnected to the process controller 48 is code reader logic 50 that responds to a pulse train from a reader scan head 52. Typically, the code reader is a series FM reader manufactured by Accu-Sort, Inc. After reading coded data, the reader utilizes a microprocessor to decode the characters and provide information to the function controller 44 through the process controller 48. Data read by the reader scan head 52 is transferred to the code reader logic 50.

Also included as part of the central controller is an input/output multiplexer unit 54 connected to the control panel 14. The multiplexer unit 54 also connects to the power panel 26 by a line which includes a blower motor 56. The input/output multiplexer 54 provides the interface between external devices and to the stacker module 32.

Summarizing, the central controller 24 includes a process controller 48 and the function controller 44 with associated logic for control of the microfiche reader/sorter of FIG. 1. Character data and operator control are input to the controllers 44 and 48 including location codes for each item to be tracked through the distribution system of the stacker modules 32 and 34. Items tracked through the process controller 48 generate a tracking signal for the operation of one of the diverter stations for the stacker units 32 or 34.

In addition to mechanical hardware for transporting an item past the various divert stations and associated pockets, each of the stacker modules 32 and 34 includes divert gates at each divert station, photocell sensors and required switches for diverting an item to a particular pocket. Typically, infrared photocell emitters and detectors are used for detecting the location and tracking of items. Sensors found in each of the stacker modules 32 and 34 include a pocket empty sensor to detect when the last document has been fed into the system, a pre-read sensor for detecting close feeds and shingle arrangements. In addition, the system includes a read window sensor to gate the reader 52 on and off. There are also skew detectors for detecting when a document tilt or a high rise occurs. The last sensor at the transport connected to the stacker module 32 detects documents approaching the first divert station. It is this sensor that generates the injection signal to identify to the process controller 48 that a document is to be tracked for distribution. Thus, each of the stacker modules has a sensor associated with each divert location. These sensors are supplements or back-ups for document tracking and also respond to document jamming. If a sensor is blocked for a longer duration than it takes for a document to pass this cell during normal operation, a jam is indicated and the transport motors 36, 38 and 40 are turned off.

Each pocket of the stacker modules 32 and 34 includes a stacker full switch to turn off the transport motors 36, 38 and 40 in order to prevent damage to other documents when a pocket is full.

Also included as part of each of the stacker modules 32 and 34 is an input/output multiplexer unit 58 and 60, respectively. The multiplexers 58 and 60 are similar to the multiplexer 54 and provide for signal transfer into and from the process controller 48. In addition, the multiplexer 58 is connected to the sensors 62 of the stacker module 32 and the multiplexer 60 is connected to the sensors 64 of the stacker module 34. It should be understood that the sensors 62 and 64 emcompass all the sensors as previously described.

Also forming a part of each of the multiplexers 58 and 60 is a solenoid driver board. The multiplexer 58 includes the solenoid driver board 66 and the multiplexer 60 includes the solenoid driver board 68. The solenoid driver boards 66 and 68 respond to tracking signals from the process controller 48 to energize divert gates.

As implemented, the system of FIG. 2 may be expanded by connecting additional stacker modules to the data lines 70 and 72.

To one skilled in document processing or item distribution it will be recognized that each of the stacker modules 32 and 34 comprises conventional hardware to selectively reroute a document or item from a main conveyor or transport system to subconveyors or pocket collecting stations. Further detailed description of the stacker modules 32 and 34 is thus not considered to be required for an understanding of the present invention, that is, the tracking of an item through a process image representing the stacker modules 32 and 34.

Figure 3:
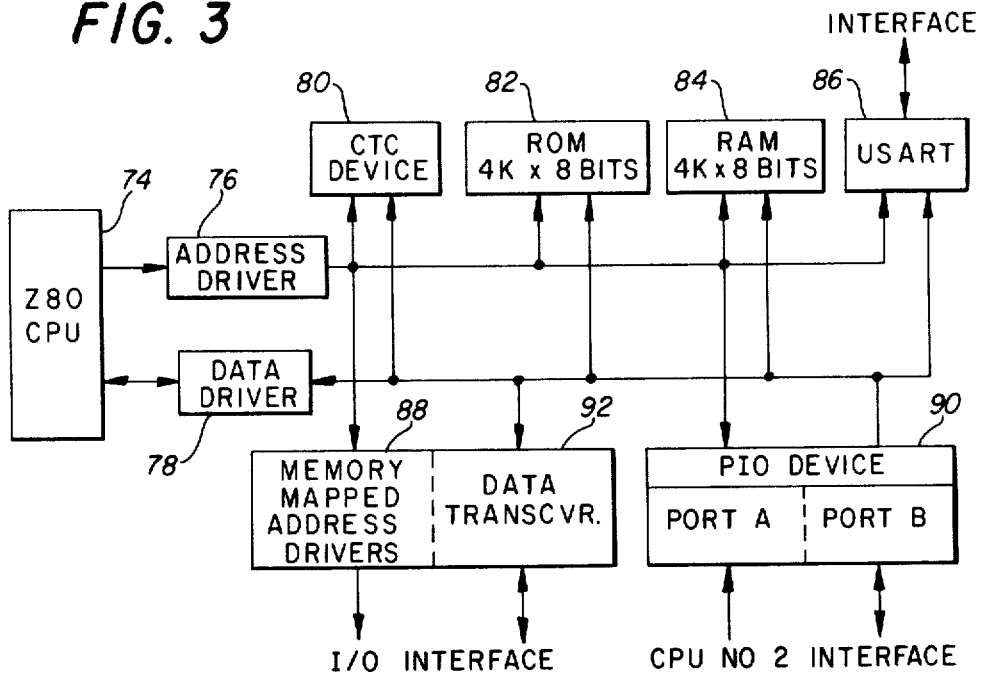
FIG. 3 is a block diagram of the tracking hardware for the process controller of the central controller of FIG. 2.

Referring to FIG. 3, to track an item through an image of the stacker modules 32 and 34 the process controller 48 includes a Z-80 microprocessor 74 providing address information through an address driver 76 and transferring data by means of a data driver 78. Connected to the address driver 76 is a CTC device 80 (clock pulse generator), a read-only memory (ROM) 82, a random access memory (RAM) 84, and a serial data stream interface module (USART) 86. In addition, the address driver 76 is connected to memory map address drivers 88 and a parallel data stream input/output interface device 90, the latter for coupling to the function controller 44. The data driver 78 also connects to each of these elements of the process controller and in addition couples to a data transceiver 92. Both the memory map address drivers 88 and the data transceiver 92 are input/output interface devices for coupling the process controller 48 to other elements of the central controller 24. The interface to the input/output drivers 88 and the transceiver 92 utilizes a bidirectional driver/receiver for data transfer and a unidirectional driver for address. Data is transferred to and from the input/output units by the memory map method by means of the drivers 88.

Each of the elements of the process controller 48 as illustrated in FIG. 3 is conventional hardware. These hardware elements are interconnected by means of a wire wrap board using interconnecting techniques as established for such elements.

Figure 4:
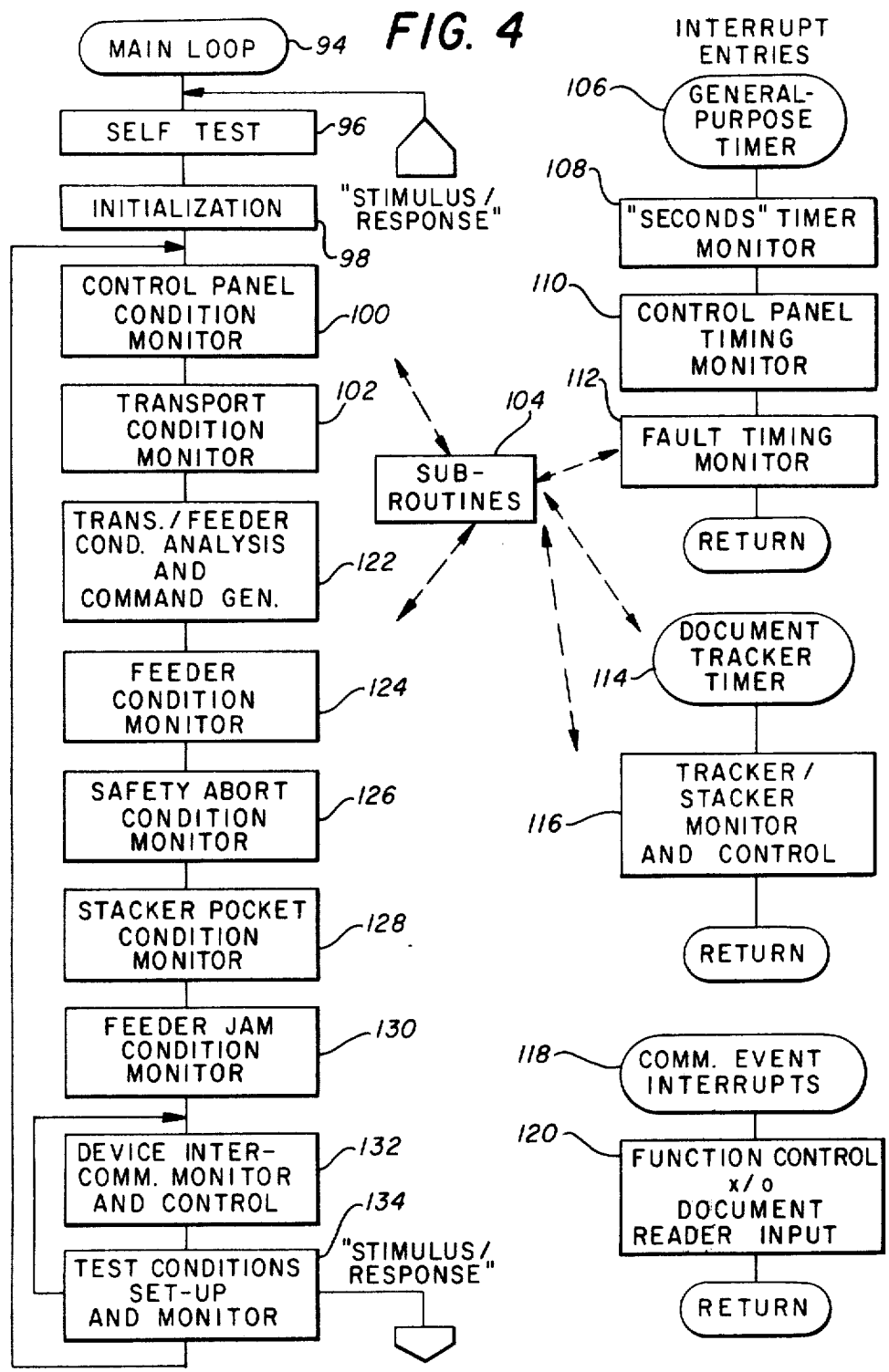
FIG. 4 is a top level flow chart of the operation of the central controller for the distribution of microfiche to pockets of the distribution system of FIG. 1, including subroutines called during the operation of the top level routine.

Referring to FIG. 4, there is shown a flow chart for the overall operation of the process controller 48 which is responsible for establishing the sequence of operation of the microfiche reader/sorter of FIG. 1. Prior to operation of the system as shown by the flow chart of FIG. 4, the central controller 24 is characterized for a particular transport configuration. The characterizing parameters for the transport image placed in memory is detailed in the listing of Table 1.

TABLE 1

```
225
226   *INCLUDE DESCRIPTOR.S
227
228   SPEED     EQU   2540   ;MM
229   SHINGLE   EQU   203    ;MM
230   SENSOR    EQU   203    ;MM
231   PITCH     EQU   229    ;MM
232   LENGTH    EQU   152    ;MM
233   SAMPLE    EQU   13     ;MM
```

TABLE 1-continued

```
234  MODULS   EQU   2
235  FACTOR   EQU   1
236  POKSMOD  EQU   6
237  PMASK    EQU   OFCH
238  RATE     EQU   2500
239  REJECT   EQU   OBH
240  RAMLOC   EQU   3000H
241  MAPBAS   EQU   2000H
242
243
244  FICHE    EQU   1
245
246  MODNO    EQU   MODULS/FACTOR
247  POKETS   EQU   POKSMOD*FACTOR
248  CLKRAT   EQU   RATE/100
249  BUCKET   EQU   (SENSOR/4)+(((SENSOR.MOD.4)*2)/4)
250  LTJAM    EQU   (3*BUCKET)-PITCH
251           COND  FICHE.EQ.0
252  QTR1     EQU   (BUCKET/SAMPLE) +(((BUCKET.MOD.SAMPLE)*2)/SAMPLE)
253  HALF     EQU   QTR1*2
254  QTR3     EQU   QTR1*3
255  MIN      EQU   ((((PITCH-LENGTH/SAMPLE)*3)/4)
256           ENDC
257           COND  FICHE.EQ.1
258  QTR1     EQU   2
259  HALF     EQU   4
260  QTR3     EQU   OCH
261  MIN      EQU   1
262           ENDC
263  MAX1     EQU   (SHINGLE/SAMPLE)+(((SHINGLE.MOD.SAMPLE)*2)/SAMPLE)
264           COND  (BUCKET.GT.LTJAM).OR.(BUCKET.EQ.LTJAM)
265           COND  FICHE.EQ.0
266  MAX2     EQU   (3*QTR3)/2
267           ENDC
268           COND  FICHE.EQ.1
269  MAX2     EQU   18H
270           ENDC
271           COND  BUCKET.LT.LTJAM
272  MAX2     EQU   (5*LTJAM)/(4*SAMPLE)
273           ENDC
274  SERVTC   EQU   ((SAMPLE*CLKRAT*39)/(SPEED/10))/MODNO
275  POKMAX   EQU   MODULS*POKETS
276
```

Line Nos. 228–241 of the listing identify the parameters input into the controller 24 to detail the transport image into memory. Factors input by an operator to characterize the controller memory to a particular transport include the transport speed, shingle sensor detection, pitch length and document position detection. Upon entry of the file as given by lines 228–241 a source code to machine code translator performs the functions as given by lines 246–275 to establish constant values. An operater powers up the system, and when ready the process controller 48 enters the main loop operation at interrupt 94 and begins a self-test 96. Following the self-test 96 the controller 48 proceeds through initialization 98. Once the process controller 48 has been initialized, it cycles through a sequence of monitoring steps beginning at 100 to monitor the condition of the control panel. Monitor operation 102 checks the condition of the transport.

The main loop continues to analyze the transport-/feeder and the command generator at a sequence 122 and then steps to monitor the condition of the document feeder at a sequence 124. A safety abort condition is monitored during sequence 126 and the stack condition of each stacker pocket in the stacker modules 32 and 34 is monitored during sequence 128. A feeder jam condition is monitored during a sequence 130 which is followed by sequence 132 for monitoring and controlling intercommunications between elements of the central controller 24. Test conditions are set up and monitored during a sequence 134 and a return is taken to the sequence 100 for monitoring the condition of the control panel.

Upon occurrence of the general purpose timer interupt 106 a timing monitor subroutine is called. This subroutine checks the "seconds" timer monitor at 108 and then monitors the control panel timing at 110. Timing faults are monitored at 112 ending this subroutine and returning the process controller 48 to the main loop.

Upon occurrence of a document tracker timer interrupt 114 another subroutine is called. This subroutine monitors and controls the stacker modules 32 and 34 through process steps at 116. This is the only function of the subroutine for tracker timing and operation of the process controller 48 returns to the main loop. When a communications event interrupt 118 occurs another subroutine is called which monitors the function controller 44 and the document reader during a sequence 120. This is the only function when the communications event interrupt occurs and the process controller 48 returns to the main loop.

At any point in the operation of the process controller 48 one of several subroutines 104 may be called. These subroutines are detailed in Table 3 at the lines identified as "call".

Each of the monitoring sequences of the main loop as shown in FIG. 4 and the other subroutines of this figure are conventional and form no part of the present invention. The implementation of each of the monitoring sequences and routines is considered to be sufficiently documented and well known to require no further detailed description.

Figure 5:
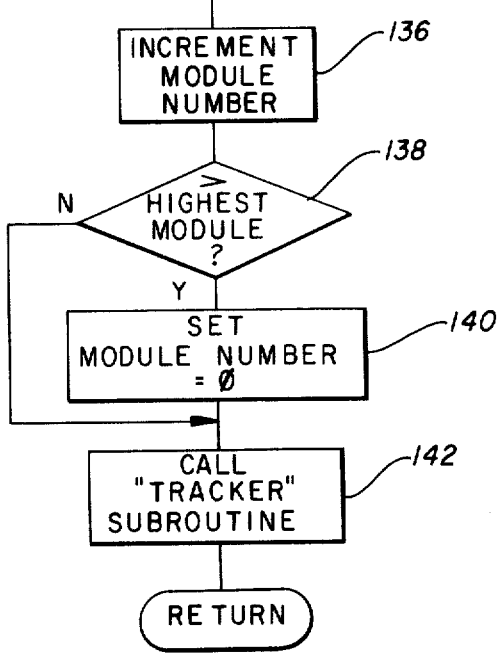
FIG. 5 is a flow chart of the tracker/stacker, monitor and control subroutine of FIG. 4.

Referring to FIG. 5, during actual tracking of items through the transport system to the stacker modules 32 and 34 the process controller 48 performs a service routine in response to a "SCANS" tracker timer interrupt. In one implementation of the process controller 48 the routine of FIG. 5 was executed at 2.5 millisecond intervals which corresponded in one implementation of the invention to one quarter inch of transport movement. Initially this routine assigns a stacker module number and in the embodiment being discussed this includes stacker modules 32 and 34. The module number is incremented at step 136 and a highest number module test is made at 138 to determine if the new module number is the highest module number in the distribution system. In the embodiment of FIG. 2, there are only two modules such that the highest module number is 2. However, it will be understood that the invention is capable of servicing additional modules.

If the highest module number has been incremented during sequence 136 then the module number is set to zero at 140 and the tracker subroutine is called at 142.

The tracker subroutine will also be called if the highest module number has not been incremented at 136. Since two stacker modules are shown in the diagram of FIG. 2, these are serviced on alternate "SCANS" interrupts which means that each module is serviced at 5 milliseconds (one-half inch of transport travel) intervals. If additional stacker modules are added, the interrupting frequency of this routine is increased appropriately. Following the completion of the tracker subroutine 142, which routine will be subsequently described, the operation of the process controller 48 returns to the monitoring loop.

Figure 6:
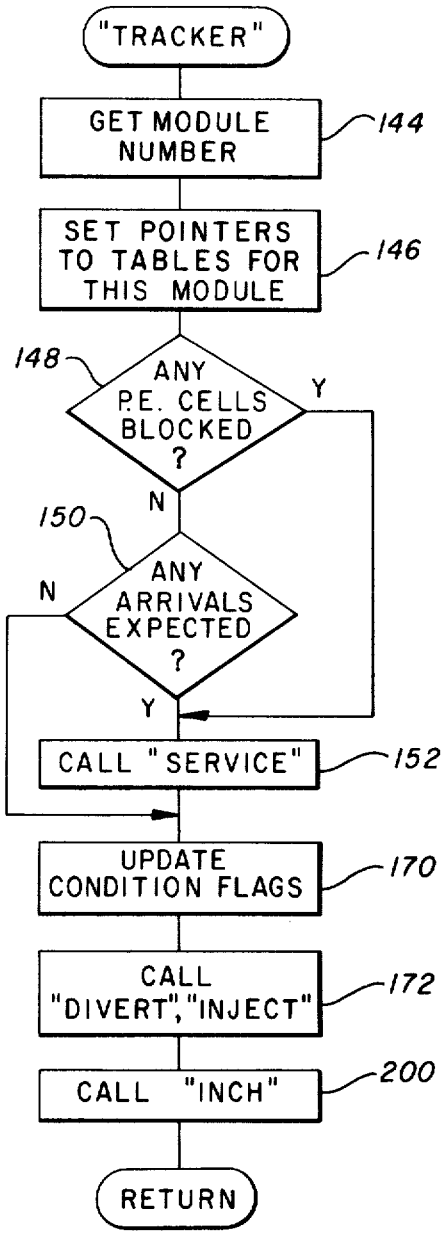
FIG. 6 is a flow chart of the tracker subroutine of the process controller of FIG. 2 for monitoring the movement of an item through the distribution system of FIG. 1.

With the system initialized by the data shown in Table 1 and with the process controller 48 in the tracking sequence the occurrence of a "tracker" interrupt during the routine of FIG. 5 calls the tracker routine of FIG. 6. This routine first identifies the module number at 144, that is, the module number as set during the routine of FIG. 5. A listing of the tracker routine is given in Table 2 where the line numbers are identified by the referenced numerals as assigned in FIG. 6. Thus, the calling of module number 144 is given by line 144 in Table 2.

TABLE 2

```
TRACKER  EX       AF,AF'
         EXX
         PUSH     IX
         PUSH     IY           ;SAVE ALL REGISTERS
         EI

;---144  GET MODULE NUMBER TO SERVICE

LD       A,(MODULE)
         LD       E,A
         XOR      A
         LD       D,A          ;DE = MODULE NUMBER

;---147  POINT TO OLD PE DATA LOCATION

LD       IY,OLDBASE
         ADD      IY,DE        ;PE CELL FLAG POINTER
         PUSH     DE           ;MODULE NUMBER

;---147  GET MODULAR INCREMENT FROM I/O BASE ADDRESS

EX       DE,HL
         ADD      HL,HL
         ADD      HL,HL
         ADD      HL,HL        ;MODULE * 8
         LD       DE,IOBASE
         ADD      HL,DE
         LD       (SERVAD),HL
```

TABLE 2 (cont.)

```
;--147   8-BIT MULTIPLY...H * E ---> HL

POP     DE              ;MODULE NUMBER
        LD      H,POKETS
        LD      L,A             ;ACCUMULATOR = 0
        LD      B,8             ;BIT COUNTER
MP1     XOR     A               ;RESET CARRY
        ADC     HL,HL           ;MULTIPLIER SHIFT, PRODUCT
        JR      NC,MP2                          DOUBLE
        ADD     HL,DE           ;NEW PARTIAL PRODUCT
MP2     DJNZ    MP1

;--147   HL = POCKETS * MODULE NUMBER
;        (MODULAR INCREMENT FOR FIRST POCKET TO SERVICE)

PUSH    HL              ;STACK FIRST POCKET

;--147   GET MODULAR INCREMENT FOR JAM COUNTERS

ADD     HL,HL           ;MODULE JAM COUNTER INCREMENT
        PUSH    HL              ;STACK = 1ST POCKET, INCREMENT
        LD      DE,CTBASE       ;COUNTER BASE ADDRESS
        ADD     HL,DE           ;FIRST COUNTER POINTER
        EX      (SP),HL         ;STACK = 1ST POCKET, 1ST COUNTER

;--147   GET MODULAR INCREMENT FOR SENSOR BUCKETS

ADD     HL,HL
        ADD     HL,HL
        EX      DE,HL
        LD      IX,SNBASE       ;SENSOR BUCKET BASE ADDRESS
        ADD     IX,DE           ;FIRST SENSOR BUCKET TO SERVICE

;--148   IF NO PE CELLS ARE BLOCKED AND NO LIGHT JAMS ARE BEING
;        MONITORED, WE DON'T NEED TO SERVICE PE CELLS & FLAGS

LD      HL,(SERVAD)     ;I/O ADDRESS
        LD      C,(HL)          ;PE CELLS THIS MODULE
        DEC     A               ;'FF', UNBLOCKED MASK
        CP      C               ;ANY BLOCKED?
        JR      NZ,SETUP
        LD      (IY+DARKS),0    ;NO, RESET DARK JAM ARM FLAGS
        LD      A,(IY+LIGHTS)
        AND     PMASK           ;ANY ARMED FOR LIGHT JAM?
        JR      NZ,SETUP
        POP     HL              ;NO
        POP     DE              ;CLEAR STACK
        CALL    CLEAR           ;CLEAR JAM COUNTERS
        JR      UPDATE          ;BYPASS SERVICE

;--152   WE NEED TO SERVICE...GET POINTERS FROM STACK

SETUP   POP     HL              ;FIRST COUNTER POINTER
        POP     DE              ;FIRST POCKET NUMBER
        SET     7,D             ;SET PIECE MARKER
        LD      B,8             ;LOOP COUNTER
```

TABLE 2 (cont.)

152 (cont.)

```
         CALL    SERVCE            ;TRACK 'EM

UPDATE   LD      (IY+LASTPE),C     ;UPDATE OLD PE DATA

CALL    DIVERT            ;SET DIVERTERS

CALL    INJECT            ;PASS PIECES

CALL    INCH              ;MOVE TRANSPORT IMAGE

POP     IY
         POP     IX
         EXX
         EX      AF,AF'            ;RESTORE REGISTERS
         RET
```

Following the identification of the module number the tracker routine advances to set pointers 146 to establish tables for the module numbers. Each instruction completed at 146 is identified in Table 2 by lines 147. It is during this portion of the subroutine of FIG. 6 that the image for a stacker module is called for the tracking of a location code to generate a divert signal. Following the setting of pointers at 146 each of the sensors of the identified stacker module is checked during sequence 148 with the detail of this checking also given in Table 2 at line 148. It is during this sequence of the tracking routine that flow anomalies of items in the transport system are checked and the image corrected if necessary. It should be understood, however, that the method of tracking an item through a distribution system does not rely on the checking of the anomalies as in the description of the present embodiment.

If no sensors are blocked then a check is made during sequence 150 to determine if any item arrivals are expected. When arrivals are expected the routine advances to a service subroutine 152 which is also called if a photoelectric sensor is blocked at 148. Calling of the service subroutine is identified in Table 2 at line 152 with the service routine detailed in Table 3.

TABLE 3

```
;:::::::::::::    TRACKER SUBROUTINES    :::::::::::::::;

;--153    STACKER MODULE SERVICE

SERVCE   PUSH    BC
         PUSH    HL
         PUSH    IX

;--154    CHECK NEXT PE CELL STATE

LOOP     XOR     A
         ADD     A,C               ;PE DARK?
         JP      M,LIGHT

;--155    PE IS BLOCKED (DARK)

DARK     SET     7,(IY+DARKS)      ;ARM FOR DARK JAM
         XOR     (IY+LASTPE)       ;YES, BEEN DARK?
         JP      P,JAMTS1
```

TABLE 3 (cont.)

```
;--156  FURTHERMORE, IS LEADING EDGE

LEAD    LD      A,(IX+SENSE)    ;PIECE MATCH POCKET?
        CP      D
        JR      NZ,LEAD1
        LD      A,(IX+SENSMO)
        CP      E
LEAD1   RES     7,(IY+DIVERS)
        JR      NZ,PASSIT
        SET     7,(IY+DIVERS)   ;YES, SET DIVERTER FLAG
        RES     7,(IX+1)        ;RESET ADDRESS MARKER

;--157  PASS IMAGE PIECES DOWN IMAGE TRANSPORT

PASSIT  CALL    NZ,PASS1        ;SENSE BUCKET TO BUCKET 2
        CALL    PASS0           ;BUCKET 3 TO EJECT BUCKET

;--158  SEE IF THIS PIECE IS AN EARLY ARRIVAL (CLOSE FEED)

BIT     7,(IY+LIGHTS)   ;ARMED FOR LIGHT? (PIECE EXPECTED)
        JR      Z,RESETC
        RES     7,(IY+LIGHTS)   ;YES, DISARM LIGHT JAM COUNT

LD      A,MIN           ;CLOSE FEED?
        CP      (HL)
        JR      C,RESETC
        LD      A,CLOSE
        JP      JAMS1

;--159  RESET JAM COUNTER

RESETC  LD      (HL),0          ;RESET COUNTER

;--160  MOVE POINTERS TO NEXT POCKET, THIS MODULE

NEXT    RLC     (IY)            ;NEXT PE CELL FLAG
        RLC     (IY+LIGHTS)     ;NEXT LIGHT ARM FLAG
        RLC     (IY+DARKS)      ;NEXT DARK ARM FLAG
        RLC     (IY+JAMS)       ;NEXT JAM FLAG
        RLC     (IY+DIVERS)     ;NEXT DIVERTER FLAG
        RLC     (IY+EJECTS)     ;NEXT EJECT FLAG
        RLC     C               ;NEXT PE CELL

NEXT0   INC     DE              ;NEXT POCKET
        PUSH    DE
        LD      DE,2
        ADD     HL,DE           ;NEXT COUNTER
        LD      DE,8
        ADD     IX,DE           ;NEXT SENSOR BUCKET
        POP     DE
        DJNZ    DONCHK          ;THIS MODULE DONE?
```

TABLE 3 (cont.)

```
;---161  ALL POCKETS SERVICED...EXIT

POP     IX
        POP     HL
        POP     BC              ;YES
        RET

;---162  DON'T SERVICE UNUSED POCKETS, BUT MAINTAIN FLAG ALIGNMENT

DONCHK  LD      A,8-POKETS      ;GET EXTRA ROTATIONS
        CP      B               ;ANY?
        JP      C,LOOP
        JP      NEXT            ;YES, JUST ROTATE WITHOUT CHECKS

;---163  BODY OF PIECE...CHECK FOR SHINGLES

JAMTS1  LD      A,MAX1          ;MIDDLE OF DARK--SHINGLE?
        CP      (HL)
        JR      NC,NEXT

JAMSET  LD      A,DARKJ         ;YES, GET JAM CODE

JAMS1   LD      (JAMFLG),A      ;SAVE CODE
        SET     7,(IY+JAMS)     ;SET POCKET JAM FLAG
        CALL    JAM             ;SHUT DOWN
        JR      RESETC          ;KEEP TRACKING

;---164  PE CELL UNBLOCKED...BETWEEN PIECES

LIGHT   XOR     (IY+LASTPE)     ;LIGHT--BEEN DARK?
        JP      M,TRAIL

;---165  NOT TRAILING EDGE...IF A PIECE IS ON THE WAY, CHECK
                                                            JAM COUNT
        XOR     A               ;NO, ARMED FOR LIGHT JAM?
        ADD     A,(IY+LIGHTS)
        JP      P,NEXT

*LIST ON
;---166  EARLY SHUT ON DIVERTER

CALL    PRESHUT

*LIST ON

JAMTS2  LD      A,MAX2          ;YES, JAM?
        CP      (HL)
        JP      NC,NEXT

;---167  EXPECTED PIECE IS LATE

LD      A,LIGHTJ        ;YES, GET CODE
        JP      JAMS1

;---168  PE CELL UNBLOCKED...TRAILING EDGE OF PIECE

TRAIL   RES     7,(IY+DARKS)    ;TRAILING EDGE--RESET DARK
                                                        ARM FLAG
        COND    FICHE.EQ.0
*LIST ON
```

With reference to Table 3, the stacker module to be serviced is identified at line 153 and after identification the state of sensors are checked at line 154. A check is made if a sensor is blocked (dark) at line 155 and an evaluation is made if the sensor is blocked by the leading edge of an item at line 156. It is during this sequence that the location code tracks through the image of the transport and is checked to determine if it matches the location code of the sensor being checked. If a location code match occurs then a divert flag is set to divert an item at the pocket identified with the sensor and the location code for this item is removed from the image. If a match does not occur then the location code is passed down the image transport at line 157 to pass the location code to the image memory elements identified with the subsequent pocket.

When a close feed condition is identified by operation of the program at line 158 then a physical check is triggered by the image feed. The service routine continues to reset jam counters at line 159 and moves the pointers for the identified stacker module to the next pocket at line 160. When all pockets of a stacker module have been serviced, the routine exits at line 161 to continue the tracker routine of FIG. 6. However, if all pockets have not been serviced then the service routine continues at line 162.

Also completed during the service routine is a check for shingles at line 163, that is, overlapping documents moving through the distribution system. To check for a shingle condition sensors are checked at line 164 where an unblocked condition indicates a space between adjacent items moving through the distribution system. When a trailing edge of a document is not identified, but it is known that an item is moving through the system, then a jam condition is checked at line 165. Depending on the response time of the divert gates, an early shut flag is set at line 166 to insure that the divert gate is closed before a subsequent document enters the pocket area. When a divert flag is set and the expected item is late to arrive at a sensor then the service routine completes the sequence at line 167. Also during the service routine a check is made of the sensor blockage to determine if the trailing edge of an item is detected at line 168. If a trailing edge is detected then a dark alarm flag is set to condition the process controller 48 for a subsequent item moving through the system.

Figure 7:
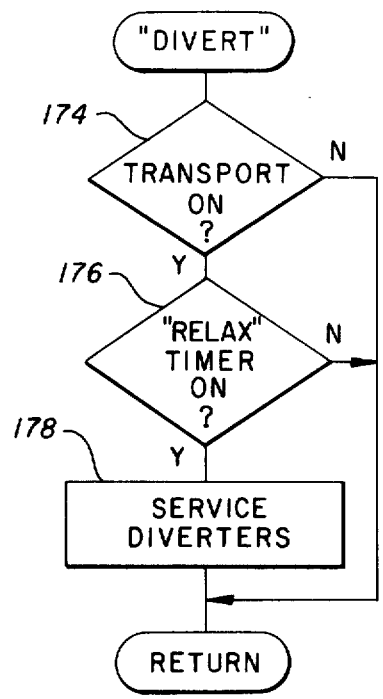
FIG. 7 is a flow chart of the divert subroutine called during operation of the tracker subroutine of FIG. 6.

Upon completion of the service routine at 152, update condition flags are set at 170 and either a "divert" or "inject" subroutine is called at 172. When a divert flag is set at line 156 of the service routine 152 the subroutine of FIG. 7 is called to first check to determine if the transport for the identified module is operational during sequence 174. Timer conditions are checked at 176 and a divert gate is serviced during sequence 178 to cause an item to be diverted from the transport system into an identified pocket. After servicing the divert gate at 178 the system returns to the subroutine of FIG. 6.

When an "inject" flag is set at 172 the subroutine of FIG. 9 is called at 180. Arrival flags are set for all pockets following the ejecting pockets during sequence 182 and a check is made at 184 if the ejection is to the last pocket. If the previous pocket ejection is the last in the stacker module as determined at 186 then arrival flags are set during sequence 188 for pockets in the adjacent downstream stacker modules. Pockets in the next module are checked during sequence 190 and each pocket is checked for ejection of an item during sequence 192. If an ejection has occurred then the address of the location code is moved to the next location at 194 and a pointer set for the next pocket during sequence 196.

When the subroutine of FIG. 9 is completed at 198, the tracker subroutine continues by calling an "INCH" routine at 200. The INCH subroutine, detailed in FIG. 8, performs sequence 202. The INCH subroutine is detailed in Table 4 where the image transport is first moved at line 204 to increment the jam counters if armed. If carrying out the program sequence of line 204, a location code is propagated through the image of a stacker unit in a manner analogous to a bucket brigade.

TABLE 4

```
;--204   MOVE IMAGE TRANSPORT, INCREMENT JAM COUNTERS IF ARMED

INCH     LD      B,POKETS
         LD      DE,8
         LD      A,(IY+LIGHTS)
         OR      (IY+DARKS)      ;COMBINE FLAGS
INLOOP   PUSH    AF

ADD     A,0             ;SET STATUS
         JP      P,NOTARM        ;ARMED?
         LD      A,40H           ;YES, JAM AT MAXIMUM COUNT?
         CP      (HL)
         JR      C,NOTARM
         INC     (HL)            ;NO, INCREMENT IT
NOTARM   INC     HL              ;POINT INCH COUNTER
         LD      A,(HL)          ;GET INCHER COUNT
         CP      QTR3            ;THREE QUARTERS THROUGH POCKET?

COND    FICHE.EQ.0
         JR      Z,NOTA1
         ENDC
```

TABLE 4 (cont.)

```
            JP      P,NOTA2             ;YES, OR MORE; SKIP PASSES

CP      HALF                ;NO, HALFWAY THROUGH POCKET?
            CALL    Z,PASS0

COND    FICHE.EQ.1
            CALL    Z,PASS2             ;YES, MAKE APPROPRIATE PASSES
            ENDC
            CP      QTR1                ;QUARTER WAY THROUGH POCKET?
            NOP
            NOP                         ;POSSIBLE SPOT FOR EARLY SHUT
            NOP
NOTA1       CALL    Z,PASS2
            INC     (HL)                ;STEP INCHER COUNT
NOTA2       POP     AF
            INC     HL                  ;NEXT JAM COUNTER
            ADD     IX,DE               ;NEXT SENSOR BUCKET
            RLC     A                   ;NEXT ARM FLAG
            RLC     (IY+EJECTS)         ;NEXT EJECT FLAG
            DJNZ    INLOOP              ;DONE?
            LD      B,8-POKETS          ;REALIGN EJECT FLAGS
NOTA3       RLC     (IY+EJECTS)
            DJNZ    NOTA3
            RET                         ;YES

;--205  IF THERE'S A PIECE IN BUCKET 3, PASS IT TO EJECT BUCKET

PASS0       PUSH    AF
            XOR     A
            ADD     A,(IX+5)            ;PIECE MARKER?
            JP      P,POR
            LD      (IX+7),A            ;YES, PASS IT
            RES     7,(IX+5)            ;RESET MARKER
            LD      A,(IX+4)
            LD      (IX+6),A            ;PASS LEAST SIG PART
POR         POP     AF
            RET

;--206  PASS SENSOR BUCKET TO BUCKET 2 AND RESET INCH COUNTERS

PASS1       LD      A,(IX)
            LD      (IX+2),A
            LD      A,(IX+1)
            LD      (IX+3),A
            RES     7,(IX+1)            ;CLEAR PIECE FLAG
            INC     HL                  ;RESET INCHERS
            LD      (HL),0
            DEC     HL
            RET
```

TABLE 4 (cont.)

```
;--207--  IF BUCKET 2 IS OCCUPIED, PASS IT TO BUCKET 3
;         IF EJECT BUCKET IS OCCUPIED, SET EJECT FLAG

PASS2    PUSH     AF
         XOR      A
         ADD      A,(IX+3)         ;PIECE MARKER?
         JP       P,P2E
         LD       (IX+5),A         ;YES, PASS IT
         RES      7,(IX+3)         ;RESET MARKER
         LD       A,(IX+2)
         LD       (IX+4),A         ;PASS LEAST SIG PART
P2E      BIT      7,(IX+7)         ;PIECE MARKER?
         JR       Z,P2R
         SET      7,(IY+EJECTS)    ;YES, SET EJECT FLAG
P2R      POP      AF
         RET                       ;LEAVE MARKER FOR 'INJECT'

;--208--  CLEAR THE JAM COUNTERS

CLEAR    PUSH     HL
         PUSH     BC
         LD       B,POKETS
CLR1     LD       (HL),0
         INC      HL
         INC      HL
         DJNZ     CLR1
         POP      BC
         POP      HL
         RET

;--209--  ROUTINE TO SHUT DIVERTER WHEN CALLED IF NO MATCH

PRESHUT  PUSH     AF
         LD       A,(IX+SENSE)     ;POCKET ADDRESS, MSB
         CP       D                ;MATCH?
         JR       NZ,PRE1
         LD       A,(IX+SENSMD)    ;PARTIALLY; POCKET ADDRESS, LSB
         CP       E                ;MATCH?
         JR       Z,PRE1
         RES      7,(IY+DIVERS)    ;NO, SHUT DIVERTER
PRE1     POP      AF
         RET
```

As an item enters a pocket area the INCH routine begins and progresses on a timed sequence. An image of a pocket is divided into quarters and at timed intervals the location code for an item as identified as entering a pocket area is incremented to the next quarter section. The location codes for all the items in the distribution system are incremented simultaneously in this manner. If a location code that enters a pocket area in the first quarter is identified with the pocket when the divert flag is set and that image no longer propogates through the transport image. The divert routine as given in FIG. 7 then responds to the flag to cause the divert gate to operate and an identified item moves into a pocket. This location code is then removed from the image transport.

For all location codes not identified with a particular pocket the progression continues through each quarter and subsequently passes into the first quarter of the adjacent pocket. The image of the transport system in the process controller 48 appears in memory elements of the processor to which the location codes are stepped in sequence.

Figure 8:
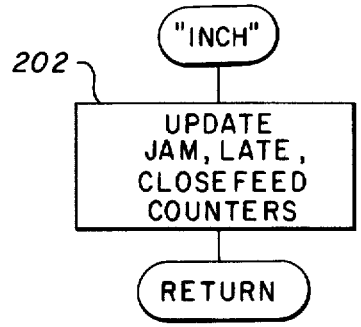
FIG. 8 is a flow chart of an "inch" advancing subroutine called during operation of the tracker routine of FIG. 6.

When a location code is in the fourth quarter of the transport image then the INCH routine of FIG. 8 completes the sequence of line 205 to pass the location code from the last quarter, identified as the "Eject Pocket Lines 205, 206 and 207" of Table 4. This sequence describes the passing of a location code between subsequent quarters of the transport image. In Table 4 each quarter is identified as a "Bucket". The "sensor bucket" of line 206 is the first section of the transport image for a given pocket. Each time a location code enters a "sensor bucket" it is identified to set the timing sequence for passing the location code to subsequent sections of the transport image. The INCH subroutine of FIG. 8 also clears the jam counters during sequence 208 and calls a routine at 209 to shut a divert gate if no match occurs between that location code and an identified code for a divert gate.

In operation of the process controller 48 for tracking an item through the distribution system, an image of the transport is stored in the process controller 48 and characterized by operator input data. Each time an item passes a sensor at the entrance to a stacker module an inject flag is set to identify to the process controller that another location code is to be processed to the transport image. The location code is tracked through each pocket by an "INCH" routine which divides the pocket into quarters. When the location code of an item matches a divert gate identification code in one of the tracker modules a divert flag is set to cause the divert routine of FIG. 7 to open a divert gate and drop the item into an identified pocket. The location code for this item is removed from the image transport while other location codes continue to be sequencially advanced through each pocket. All location codes for items in the transport system are advanced simultaneously through pockets of a module with each module 32 and 34 of FIG. 2 alternately sequenced.

While not required by operation of the method of the present invention, various sensors are located along the distribution system to determine shingle conditions of items and also jam conditions. These provide a back-up for the tracking of location codes through the image transport to insure that the physical transport is in agreement with the image transport of the process controller 48. When an anomalous situation exists in the distribution system as determined by one of these check sensors the process controller 48 shuts down the sorter for operator attention.

Each of the various routines and subroutines relating to the tracking function of the process controller are illustrated in FIGS. 5–9 with details of the flow charts given in Tables 1–4. Where details of the flow charts are not detailed in tables their implementation is considered to be within available literature. For example, the divert routine of FIG. 7 will be readily recognized as a straight forward program implementation.

Whereas the present invention has been described with respect to specific embodiments thereof, it will be evident to those skilled in the art that numerous modifications and alterations are possible without departing from the spirit and scope of the invention.

We claim:

1. A method of tracking an item identified by a location code to one of a plurality of diverter stations in a distribution system, comprising the steps of:
   injecting items in sequence into the distribution system, each item identified by a location code,
   generating an injection signal in response to each item injected into the distribution system indicating that a location code is to be tracked,
   advancing the location code for each item through a series of storage locations representing an image of the distribution system to track the movement of each item, each storage location representing an increment of distance in the distribution system, one or more of the storage locations having an identifying code identifying one of the plurality of diverter stations, and
   generating a tracking signal to a diverter station associated with a location code.

2. The method of tracking an item as set forth in claim 1 including the step of sensing an item location when moving through the distribution system to generate tracking confirmation signals for location codes advancing through the distance related increments.

3. The method of tracking an article as set forth in claim 1 wherein the step of advancing the location codes includes timing the advancement of such codes to follow the movement of the distribution system.

4. The method of tracking an article as set forth in claim 3 wherein the location codes are advanced a preset number of increments for each diverter station.

5. A method of tracking a document identified by coded information to one of a plurality of diverter pockets in a distribution system, comprising the steps of:
   injecting a plurality of documents in sequence into the distribution system,
   advancing the coded information for each document through a series of storage locations representing an image of the distribution system to track the movement of each document in the distribution system, each storage location representing an increment of distance in the distribution system, one or more of the storage locations having an identifying code identifying one of the plurality of diverter pockets,
   comparing the coded information for a document with the identifying code of a storage location when that document reaches that storage location, and
   generating a tracking signal to the diverter pocket associated with the coded information if the coded information matches the identifying code of the storage location.

6. The method of tracking a document as set forth in claim 5 including the step of initializing the storage locations with a predictor function to tailor the advancing step to the physical configuration of the distribution system 7. The method of tracking a document as set forth in claim 5 including the step of monitoring the leading edge location of a document at each diverter pocket to update the step of advancing as the coded information enters storage locations identified with a pocket.

8. The method of tracking a document as set forth in claim 5 including the step of generating timing signals to control the step of advancing in synchronism with the movement of the distribution system.

9. The method of tracking a document as set forth in claim 5 wherein the coded information for each document in the distribution system is advanced simultaneously through the storage locations.

10. A method of tracking a document identified by coded information identifying one of a plurality of diverter pockets in a distribution system, comprising the steps of:
injecting a plurality of documents in sequence into the distribution system,
generating an injection signal in response to each document injected into the distribution system,
encoding information from each document in sequence into a first storage location,
advancing the coded information for each document through a series of such storage locations representing an image of the distribution system to track the document movement, each storage location representing an increment of distance in the distribution system, one or more of the storage locations having an identifying code identifying one of the plurality of diverter pockets,
comparing the coded information for a document with the identifying code of a storage location when that document reaches that storage location, and generating a tracking signal for actuating a diverter pocket when a comparison identifies the coded information with an associated diverter pocket.

11. The method of tracking a document as set forth in claim 10 including the step of initializing the storage locations with a predictor function to tailor the advancing step to the physical configuration of the distribution system.

12. The method of tracking a document as set forth in claim 11 including the step of generating timing signals to control the advancing step in synchronism with the movement of the distribution system.

13. The method of tracking a document as set forth in claim 11 including the step of generating timing signals at a rate related to the movement of the distribution system, said timing signals controlling the step of advancing in synchronism with the movement of the distribution system.

14. The method of tracking a document as set forth in claim 10 including the step of monitoring the distribution system and documents moving therethrough to shut down the step of advancing upon detecting a malfunction.

15. The method of tracking a document as set forth in claim 10 including the step of monitoring the document location in the distribution system to generate tracking confirmation signals for the coded information advancing through the storage locations.

16. The method of tracking an item as set forth in claim 1 further including the step of comparing the location code for an item with the identifying code of a storage location when that item reaches that storage location to control the generation of the tracking signal.

17. The method of tracking an item as set forth in claim 16 wherein the tracking signal is generated if the location code matches the identifying code of the storage location.

* * * * *